July 31, 1934. T. G. FREDERICK ET AL 1,968,250
CONTINUOUS PROJECTING MOTION PICTURE MACHINE
Filed April 18, 1932 3 Sheets-Sheet 2
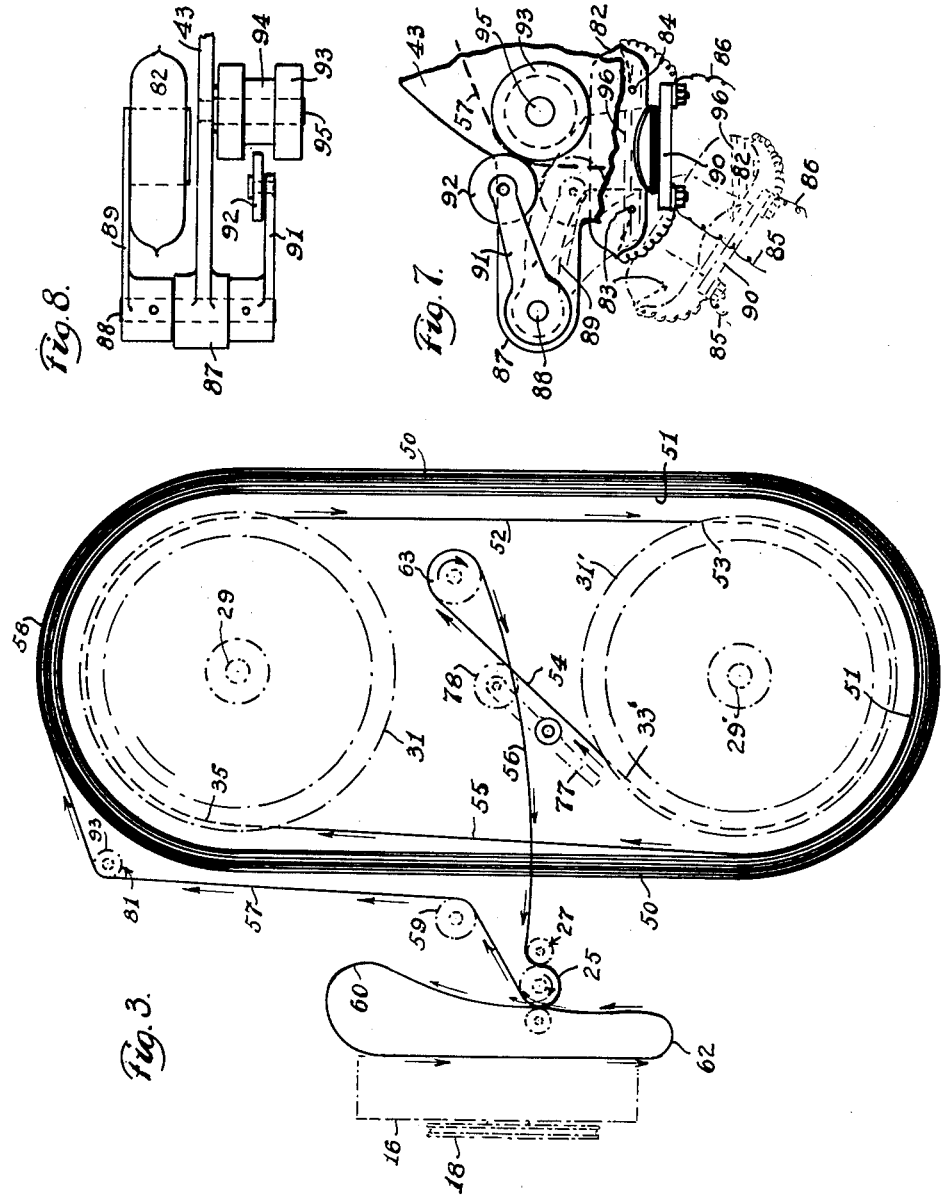
INVENTORS:
Tilghman G. Frederick
Earle M. Wooden
By Harold D. Penney ATTORNEY.

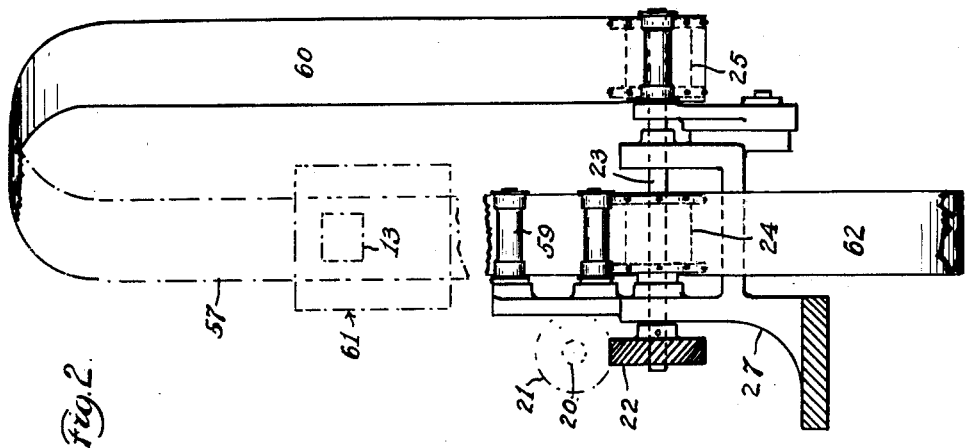

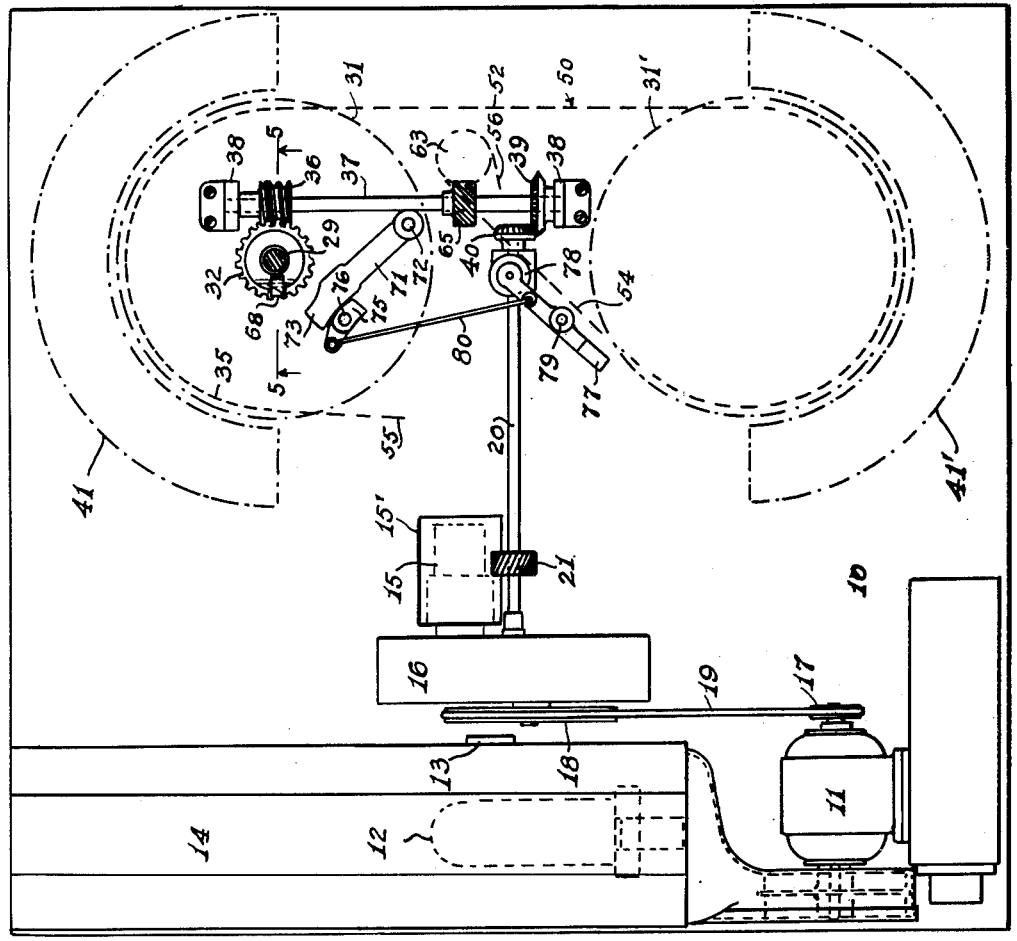

Patented July 31, 1934

1,968,250

UNITED STATES PATENT OFFICE 1,968,250

CONTINUOUS PROJECTING MOTION PICTURE MACHINE

Tilghman G. Frederick, Orange, and Earle M. Wooden, Leonia, N. J., assignors to John Thompson, New York, N. Y.

Application April 18, 1932, Serial No. 605,886

27 Claims. (Cl. 88—18.7)

The present invention relates to improvements in motion picture projecting machines and has for its main objects the provision of a small and portable projector, as for household or advertising use, although not thus limited, in which desirable continuous running of the machine is secured, together with continuous or endless film operation.

To this end, and in order to secure another object of the invention, the organization includes mechanism for accommodating the film in a loop, which is elongate in form, and which includes multiple layers or superposed turns, whereby to contain several hundred feet of film.

The loop includes, separate from and continuous with its body or main portion, a single turn or portion, and a further object of the invention is to so dispose these portions, for easy insertion in the apparatus, and for the joining of their ends, that the multiple layers or body of the loop may first be placed in position independently of the single ply, following which the latter may be conveniently formed or erected, prior to joining the ends as aforesaid.

One feature of the invention is spaced wheels, with frictionally engaging surfaces, for the aforesaid single ply; and another feature is spaced anti-friction segmental carriers or wheel sections, each of which cooperates with or is placed adjoining a wheel, to facilitate movement of the outer multiple layers. Continuous with the outer ply of these layers is a film portion which, before being joined to the end of the single ply, and also during operation, cooperates with the intermittent film feed mechanism, which is actuated by an internally mounted electric motor.

Since the inner wheels engage the film frictionally, while the outer multiple ply portion, at one of its sides, adjoins the said intermittent feed mechanism, this arrangement is effective to remove the main load from the film at the point where the latter cooperates with the light active portion of the projector, this being to secure an additional object of the invention.

A still further object is to provide a new drive means whereby the body of the film or the outer layers may be driven continuously at a uniform speed, while its adjoining portions, that is to say those at the light active mechanism and at the inner wheels, may be driven intermittently.

Additional objects are the provision of new driving means whereby all the film driving elements may be driven from the internally housed motor by a substantially unitary drive means; and also by means in connection with the drive means between the outer portion of the loop and the motor whereby overrunning of said loop may be prevented.

Yet another object is to provide automatically operative means which may be effective, as in the case of breakage of the film, to prevent further movement of any part of the mechanism so as to save the broken film from mutilation. This latter means is in the form of a circuit breaker to stop the motor.

With the above indicated objects in view, and others which shall hereinafter appear, the invention resides in certain novel constructions and arrangements of parts, the essential features of which are herein clearly described, and fully illustrated in the accompanying drawings, in which:

Fig. 1 is an elevational view in which the mechanism is shown in connection with a housing wall, the latter being fragmentarily shown;

Fig. 2 is an enlarged vertical section taken on the line 2—2 of Fig. 1;

Fig. 3 is a diagrammatic view in which the movements of the film, including its loop and the intermittently movable portions, are represented;

Fig. 4 is a view of a wall of the housing on which is shown part of the structure in skeleton condition;

Fig. 5 is an enlarged horizontal section taken on the line 5—5 of Fig. 4;

Fig. 6 is a horizontal section taken on the line 6—6 of Fig. 5;

Fig. 7 is a side view of the film controlled switch unit; and

Fig. 8 is a plan view of the film controlled switch unit.

Similar characters of reference refer to corresponding parts throughout the several views.

Carried by one wall or section 10 of a frame or housing, which includes a removable section or cover, not shown, is an electric motor 11, in the circuit of which is a lamp 12, the light source of which is disposed at an aperture 13 of a lamp casing 14 to cooperate with a prism 15 on the opposite side of the intermittent mechanism 16 of the projector, hereinafter further referred to. Projection is effected through an opening 15' in the wall 10, opposite the prism.

Driven by a sheave 17, which is rigid with the shaft of said motor, is another sheave 18, there being also a cooperating belt 19; and revolvable by this latter sheave is a drive shaft 20, a spiral gear 21 of which meshing with a mating gear 22, revolves a shaft 23 on which are mounted sprocket wheels 24 and 25 for the film, said shaft with the mountings being supported by a double armed bracket 26. Adjustable pressure rolls 27, manipulable by an arm 27', and another roll terminally carried on a pivoted arm 28, as shown in Fig. 1, movably engage the film on said sprockets.

Carried also by the wall 10 is a shaft 29, and cooperating with the hub 30 of a wheel 31 is a worm gear 32, so that said latter wheel, which has a plain periphery 33, between like flanges, as at 34, engages with about half of its circumferential face a turn 35 of the film to drive the latter. A thread 36 on a shaft 37 turns said wheel, through the medium of the gear 32, the last mentioned shaft, which is journalled in brackets 38 on the wall 10, having a terminal bevel gear 39 which meshes with another bevel gear 40 on the drive shaft 20.

In order to form a complete inside structure for the novel and free running arrangement, another shaft 29' is carried by said wall 10, in the particular embodiment of the invention here selected for disclosure; and on this shaft is another wheel 31', generally like the first mentioned one, and having also a plain periphery 33' and flanges 34'.

Carried also by the wall 10 and spaced from the respective wheels 31, 31' are anti-friction segmental film carriers 41, 41', which are about alike. These carriers, which are distantly positioned, as shown, to bring about the advantageous result, are in effect wheel segments, there being rollers mounted thereon, as shall presently appear. Fastening elements, each alike and numbered 42, attach a flange 43 of the top segment to the wall 10, and this flange may be any distance from said wall, since interposed bushings, or the like, not shown in the drawing, may be mounted on the shanks of these elements.

The rollers already referred to include an arcuate bank 44 for the flat surface of the film. Pins, as shown, carry said roller between the base or inner portion of the flange 43 and a rigid strip 45. In radial relation with the center of the arc of said strip, and carried by and in the plane of said flange are rollers 46, in the present instance shown as four in number, there being slots, as at 47, for the rollers.

On the near side of the structure, as seen in Fig. 1, being at the ends of the rollers 44, are radially disposed rollers 48, only two of the latter being here shown. Rising from the strip 45, and turned over and held on the flange 43, are pins 49 on which said rollers 48 are turnable. These radial rollers, of course, engage and guide the opposed edges of the film. The segment 41', which is provided with rollers 44', 46' and 49', the latter being at a strip 45', is held by screws 42', as indicated.

The wall 10 and its mountings, which are easily manipulable as a unit, may be placed with said mountings uppermost to receive any quantity of film, as in the form of a loop or reel 50, which is shown in Fig. 3 as containing about seven turns. Continuous with the inner turn or layer 51 of the loop, which engages the rollers, as at 44', is a portion 55 which, continuing at 35, as aforesaid, passes over the wheel 31 and then, beyond the straight portion or length 52, engages the wheel 31' at 53, to leave said wheel at 54.

This is a convenient place to join the ends of the film, since a portion of the latter, numbered 56 and passing to the intermittent mechanism 16, also passes, as at 57, to the outer turn 58 of the loop 50. The portions 35, 52, 53 and 55 form generally an inner ply for the loop, and before joining the ends of the film, said portions, after placing the outer turns 50 in position on the segments 41, 41', are easily passed edgewise, into position on the wheels, through the spaces, between the flanges 34, 34' and said segments.

The portion 57, which passes below a guide sheave 59 to the sprocket 24, is disposed in the plane of film wheels, and as the sprocket 25 is distant from said plane (see Fig. 2) the portion 56 moves clear of said loop to a sprocket 63, and thence to join said portion 54. From the portion 56 movement of the film is over the sprocket 25 to form a loop 60, past the gate 61 at the intermittent mechanism, and then through a loop 62 to said sprocket 24 and portion 57.

The aforesaid sprocket 63 is mounted on a shaft 64 (see Fig. 1) and on this shaft is a spiral gear which is formed like and is in mesh with a spiral gear 65 on the shaft 37. Rotation of this latter shaft is constant, but that of the wheel 31 is intermittent, since the constantly revolvable gear 32, referring to Figs. 4 and 5, carries a pivot 66, on which is mounted a lever 67. One arm or terminal 68 of this lever forms a detent for successively engaging and releasing the teeth 69 of a ratchet wheel which, by pins 70, is held fast with said wheel 31.

To actuate the lever 67 an arm 71 is pivoted at 72, and one end 73 of this arm is caused to periodically urge the head 74 of said lever for releasing its detent 68. An actuator 75 for said arm is pivoted at 76 and another arm 77, carrying a roller 78, which engages the film, is pivoted at 79. The sprocket 63, which is spring controlled, has also intermittent movement; and when this sprocket is held by its spring the film, as at 54, sags or drops followed gravitationally by the roller 78 and arm 77, which causes movement of said actuator 75 and displacement of said detent, as shown in dotted lines in Fig. 5, there being a connecting link 80. When the sprocket 63 again moves, the film 54 is drawn taut, and the end 73 of the arm 71 moves from the head 74 to allow engagement of said detent 68 for the next movement of the wheel 31, this being for an interval or step of one tooth, although two or more teeth may be stepped.

In order to stop the mechanism automatically on certain occasions, as when a break may occur in the film, we provide a novel switch 81, as shown in Figs. 1, 7 and 8. The motor 11 is supplied with current from any source, and said switch, which includes a mercury tube 82, is disposed in the circuit of the motor, there being electrodes 83, 84 in the tube, from which wiring portions 85, 86 extend to and connect with the wiring of said motor.

Extending from the segment 41 is a hub 87, and fixed on one end of a pivotal rod 88, which is carried by the hub, is an arm 89. On a terminal 90 this arm, above insulating material, as shown, the tube 82 is fixed. The other end of the rod 88 carries an arm 91, on the end of which is a roller 92; and another roller 93, having a relatively large groove 94, is revolvable on a pin 95 of the flange 43.

The mercury level 96 of the tube is normally above the electrodes 83, 84 to connect the latter; and the film, as between 57 and 58, travels over the roller 93 and thereby supports the roller 91 in the Fig. 7 position. But if the film breaks, and is thereby moved from the roller 93, the roller 92 drops through the groove 94, which causes the tube to descend to the dotted line position of said figure. The mercury line 96 then moves to one end of the tube, which opens the connection across the electrodes and the motor ceases, to stop the mechanism. This prevents displacement of the parts, particularly the film.

Considerable particularities of description, as to detail of parts, capacities and utilities are hereinbefore stated, but it will be understood that these statements, made with particular reference to the elements now preferred, of the many possible embodiments of the invention which are contemplated, are not in any way to be taken as limitative of the invention. Inasmuch as many changes could be made in the constructions at present disclosed, and many apparently widely different embodiments of the inventions could be made without departing from the scope thereof, it is intended that all matter contained in the foregoing description or shown in the accompanying drawings shall be interpreted as illustrative and not in a limiting sense.

It is also to be understood that the definition of the invention contained in the following claims is intended to cover all the generic and specific features of the invention herein described, and all statements of the scope of the invention which, as a matter of language, might be said to fall between those set forth.

In other words, the scope of protection contemplated is to be taken solely from the appended claims, interpreted as broadly as is consistent with the prior art.

What is claimed is:

1. In a moving picture projecting machine, spaced wheels including a drive wheel for carrying a single layer of film loop, and opposed wheel segments spaced from said wheels and having rollers thereon for carrying multiple superposed layers outside of and continuous with said first layer, said rollers being disposed internally of the multiple superposed layers and in supporting relation therewith.

2. In a moving picture projecting machine, in combination opposed wheels including a film drive wheel, intermittent film driving mechanism, and opposed anti-friction wheel segments cooperating with said wheels for carrying between the latter and said mechanism a multiple ply loop of film, said segments having rollers thereon for engaging the inner ply of said loop in supporting relation.

3. In a moving picture projecting machine, in combination a film drive wheel, a second wheel spaced from said first wheel for carrying a looped film turn, a semi-circular roller track spaced from said first wheel, and another semi-circular roller track spaced from said second wheel and from said first track for carrying multiple loop turns outside of and continuous with said first turn, the rollers of said tracks being located interiorly of said multiple loop turns.

4. In a moving picture projecting machine, in combination spaced wheels including a film drive wheel for carrying one film layer, arcuate tracks including parallel rollers which are disposed adjacent to and on opposite sides of said wheels for carrying multiple layers of film outside of and continuous with said first layer, and rotary guides carried by said tracks for the edges of the film of said multiple layers.

5. In a moving picture projecting machine, in combination spaced flanged wheels including a drive wheel for carrying a single layer of film, and semi-circular roller tracks disposed adjacent the outer peripheral portions of said wheels for carrying multiple layers of film outside of and continuous with said first layer, the rollers of said tracks being disposed internally of said multiple layers and in supporting relation therewith.

6. In a moving picture projecting machine, in combination spaced flanged wheels including a drive wheel for carrying a single layer of film, semi-circular roller tracks disposed adjacent the outer peripheral portions of said wheels for supporting multiple layers of film outside of and continuous with said first layer, the rollers of said tracks being disposed interiorly of said multiple layers and means for moving said drive wheel.

7. In a moving picture projecting device, in combination, a constantly revolvable shaft, said shaft including a thread, an intermittently revolvable wheel, a free running gear wheel supported adjacent said wheel and having its teeth in mesh with said thread, a ratchet wheel rigid with said first wheel, and a detent carried by said gear for engaging and releasing the teeth of said ratchet wheel.

8. In a moving picture projecting device, in combination with a film carrying wheel having a hub, a ratchet wheel rigid with said hub, a constantly revolvable gear having a pivot thereon, and a detent mounted on said pivot for engaging or disengaging the teeth of said ratchet wheel whereby to render said first wheel revolvable intermittently.

9. In a moving picture projecting device, in combination a shaft, a constantly revolvable shaft including a thread, a film carrying wheel having a hub mounted on said first shaft for intermittent rotation, a ratchet wheel fixedly carried by said hub, a constantly revolvable gear also mounted on said first shaft and having teeth in mesh with said thread, and a lever pivotally mounted on said gear and including a detent terminal for engaging and disengaging the teeth of said ratchet wheel.

10. In a moving picture projecting device, in combination film driving means including an intermittently revolvable wheel, a ratchet rigid with said wheel, a movable lever cooperating with the teeth of said ratchet for controlling the revolution of said wheel, a second wheel spaced from said first wheel, means including a sprocket wheel for varying the tension on a film at said second wheel, and means disposed between said film and said lever whereby the latter may be moved by the film during its varying tension.

11. In a moving picture projecting device, in combination film driving means including a revolvable shaft, an intermittently revolvable film carrying wheel movable by said shaft, said wheel having a ratchet rigid therewith, a pivoted lever for controlling revolution of said wheel, said lever having one of its ends releasably engageable with the teeth of said ratchet a second film carrying wheel spaced from said first wheel, means including a sprocket wheel also movable by said shaft for varying the tension on the film at said second wheel, and means movably disposed adjacent said film and operable by the latter during variation of its tension whereby to move said lever.

12. In a moving picture projecting device, in combination a motor, film driving means including a shaft revolvable by said motor, an intermittently revolvable film carrying wheel movable by said shaft, said wheel having a ratchet rigid therewith, means including a pivoted lever for controlling revolution of said wheel, said lever having one end releasably engageable with the teeth of said ratchet, a second film carrying wheel spaced from said first wheel, an intermittently revolvable sprocket wheel for varying the tension on the film at said second wheel, and means movably disposed adjacent said film and operable by the latter during variation of its tension whereby to actuate said lever.

13. In a motion picture projecting apparatus comprising in combination film driving mechanism, an electric motor for operating said mechanism, and switch means operable by the film for controlling operation of said motor, said means including a circumferentially grooved roller whereon the film is removably mounted, and a switch disposed in the circuit of the motor and having an arm, a disk roller carried by said arm and supported above the groove of said first roller on the film whereby on removal of the latter said disk roller may descend into said groove so as to operate the switch and open the circuit.

14. In a motion picture projecting apparatus comprising in combination film driving mechanism and including an electric motor for operating said mechanism, means for controlling the circuit of said motor, said means including a grooved roller whereon the film is displaceably movable, a pivot rod, a switch disposed in the circuit and having an arm rigid at one of its ends with said pivot rod, a second arm rigid at one of its ends with said rod, and a relatively short roller carried by the opposite end of said second arm and supported on the film above the groove of said first roller, whereby on displacement of said film the said short roller may drop into said groove to operate the switch to open the circuit.

15. An electric circuit control device comprising in combination a displaceable tube, flexible wiring in the circuit and having level electrodes in the tube, a conducting fluid rising in the tube at least to the level of said electrodes, a pivot, an arm rigid with said pivot and carrying said tube, rotary grooved means, a destructible element disposed on said means above its groove, and another arm having one end also rigid with said pivot and having on its opposite end a rotary disk which is supported above the groove by said element whereby on destruction of the latter said disk may enter said groove, so that said arms may drop to displace said tube and the fluid level for breaking the circuit.

16. In combination, a support having a flange having a boss; a large roller rotatably mounted on said flange and having a large groove therearound; a pivotal rod in said boss parallel to the axis of the roller; a radial arm rigid on said rod and rotatably carrying a disk roller receivable in said groove; said rollers being adapted to engage a film passing between said rollers thereby to separate said rollers and hold the disk roller out of said groove; and a device operated by said pivotal rod for stopping said passing film if the disk roller moves into said groove.

17. In combination, a support having a flange having a boss; a large roller rotatably mounted on said flange and having a single large groove therearound; a pivotal rod in said boss parallel to the axis of the roller; a radial arm rigid on said rod and rotatably carrying a single disk roller receivable in said groove; feed means for feeding a film between said rollers thereby to separate said rollers and hold the disk roller out of said groove; and a device operated by said pivotal rod for stopping said means if the disk roller moves into said groove.

18. In combination, a support having a flange having a boss; a large roller rotatably mounted on said flange and having a large groove therearound; a pivotal rod in said boss parallel to the axis of the roller; a radial arm rigid on said rod and rotatably carrying a disk roller receivable in said groove; said rollers being separable by a film passing between said rollers thereby to separate said rollers and hold the disk roller out of said groove; and a device operated by said pivotal rod for stopping said passing film if the disk roller moves into said groove; said device comprising a mercury tube fast on said arm radial thereto; mercury in said tube; contacts in the tube adapted to be connected by the mercury; and circuit means connected to said contacts for controlling the operation of the device.

19. In combination, a support having a flange having a boss; a large roller rotatably mounted on said flange and having a large groove therearound; a pivotal rod in said boss parallel to the axis of the roller, a radial arm rigid on said rod and rotatably carrying a disk roller receivable in said groove; feed means for feeding a film between said rollers thereby to separate said rollers and hold the disk roller out of said groove; and a device operated by said pivotal rod for stopping said means if the disk roller moves into said groove; said device comprising a mercury tube fast on said arm radial thereto; mercury in said tube; contacts in the tube adapted to be connected by the mercury; and circuit means connected to said contacts for controlling said feed means.

20. In combination, a support having a flange having a boss; a large roller rotatably mounted on said flange and having a large groove therearound; a pivotal rod in said boss parallel to the axis of the roller; a radial arm rigid on said rod and rotatably carrying a disk roller receivable in said groove; said rollers being separable by a film passing between said rollers thereby to separate said rollers and hold the disk roller out of said groove; a mercury tube fast on said arm radial thereto; mercury in said tube; contacts in the tube adapted to be connected by the mercury; and circuit conductors connected to said contacts.

21. A supporting device for a multiple ply film coil comprising in combination a frame, vertically disposed spaced wheels revolvably mounted on said frame for carrying a single turn of a coil thereon, a pair of arcuate members cooperating with said wheels and disposed above and below the latter, said members extending as far as the diametral lines of said wheels, and rotary means carried by said members for engaging the inner ply of the other turns of the coil.

22. A supporting device for a multiple ply film coil comprising in combination a frame, spaced vertically disposed wheels revolvably mounted on said frame and positioned in the same plane for carrying a single turn of a coil thereon, a pair of arcuate members disposed above and below said members and adjacent thereto, said members extending as far inwardly on said wheels as the diametral lines thereof, and relatively small rotary elements carried by said members for engaging the inner ply of the other turns of the coil.

23. A supporting device for a multiple ply film coil comprising in combination a frame, vertically disposed spaced wheels revolvably mounted on said frame for carrying a single turn of a coil thereon, a pair of arcuate members cooperating with said wheels and disposed above and below the latter, said members being rigid with said frame extending as far inwardly on said wheels as the diametral lines thereof, rotary means carried by said members for engaging the inner ply of the other turns of the coil, and rotary means disposed radial to the respective wheels for engaging the edges of the last mentioned turns in guiding relation.

24. A supporting device for an endless multiple ply film coil comprising in combination a frame, vertically disposed spaced wheels revolvably mounted on said frame for carrying a single turn of a coil thereon, a pair of fixed arcuate members cooperating with said wheels and disposed above and below the latter, said members extending as far inwardly on said wheels as the diametral lines thereof, rotary means carried by said members for engaging the inner ply of the other turns of the coil, and means for moving said single turn.

25. A supporting device for an endless multiple ply film coil comprising in combination a frame, vertically disposed spaced wheels revolvably mounted on said frame for carrying the innermost turn of the coil, a pair of arcuate members mounted in fixed relation with said frame and disposed above and below said wheels, said members being free of said wheels and extending as far inwardly thereon as the diametral lines of said wheels, relatively small adjacently disposed rotary elements carried by said members for engaging the inner ply of the outer group of turns of the coil, and means for moving said innermost turn whereby to also move the turns of said group over said elements, said means including one of said wheels.

26. A supporting apparatus for an endless multiple ply film coil comprising in combination a frame, vertically disposed spaced wheels revolvably mounted on said frame for carrying the innermost turn of the coil, a pair of arcuate members cooperating in fixed relation with said frame and disposed above and below said wheels, said members being free of the wheels and extending as far inwardly thereon as the horizontal diametral lines of said wheels, rotary means carried by said members for engaging the inner ply of the outer group of turns of the coil, said coil being disposed in elongate form and the weight of the last mentioned turns being substantially supported by the top arcuate member and its rotary means, and means for moving said single turn, said latter means including one of said wheels.

27. A supporting apparatus for an endless multiple ply film coil comprising in combination a frame, vertically disposed spaced wheels, means revolvably carrying said wheels on the frame, said wheels adapted to carry the innermost turn of the coil, a pair of arcuate members fixedly mounted on said frame and disposed above and below the respective wheels in limitedly spaced relation therewith, said members extending inwardly as far as the horizontal diametral lines of said wheels, rotary elements carried by said members for engaging the inner ply of the outer group of turns of the coil, said coil being elongate in form and having the opposed lateral portions of its turns positioned in free parallel relation, so that the weight of said group of turns may be supported by the top arcuate member and its rotary elements, and means for revolving the top wheel whereby to move the endless coil there being a portion thereof continuous with said innermost turn and the outer turn of said group.

TILGHMAN G. FREDERICK.
EARLE M. WOODEN.